United States Patent
Iyer et al.

(10) Patent No.: US 11,260,605 B2
(45) Date of Patent: Mar. 1, 2022

(54) FLEXIBLE THERMOPLASTIC COMPOSITE COUPLING AND METHOD OF MANUFACTURE

(71) Applicant: Goodrich Corporation, Charlotte, NC (US)

(72) Inventors: Raghu Iyer, New Hartford, NY (US); Joyel M. Schaefer, Earlville, NY (US); Brayton Reed, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 213 days.

(21) Appl. No.: 16/748,308

(22) Filed: Jan. 21, 2020

(65) Prior Publication Data

US 2021/0221072 A1    Jul. 22, 2021

(51) Int. Cl.
| | | |
|---|---|---|
| B29C 70/38 | (2006.01) | |
| F16C 3/02 | (2006.01) | |
| B29C 70/34 | (2006.01) | |
| B29C 70/32 | (2006.01) | |
| B29L 31/00 | (2006.01) | |

(52) U.S. Cl.
CPC ............ B29C 70/382 (2013.01); B29C 70/32 (2013.01); B29C 70/34 (2013.01); F16C 3/026 (2013.01); B29L 2031/75 (2013.01)

(58) Field of Classification Search
None
See application file for complete search history.

(56) References Cited

U.S. PATENT DOCUMENTS

| | | | |
|---|---|---|---|
| 4,173,128 A | | 11/1979 | Corvelli |
| 4,248,062 A | | 2/1981 | Ohta et al. |
| 4,335,587 A | | 6/1982 | Thomamueller et al. |
| 5,211,901 A | | 5/1993 | Fray |
| 5,225,016 A | | 7/1993 | Sarh |
| 5,322,580 A | | 6/1994 | McIntire et al. |
| 5,454,897 A | * | 10/1995 | Vaniglia ............... B29C 70/32 156/166 |
| 5,685,933 A | * | 11/1997 | Ohta ..................... F16D 3/725 156/175 |
| 5,725,434 A | | 3/1998 | Haben et al. |

(Continued)

FOREIGN PATENT DOCUMENTS

| | | |
|---|---|---|
| DE | 102015100774 A1 | 7/2016 |
| FR | 2637536 A1 | 4/1990 |

(Continued)

OTHER PUBLICATIONS

Extended European Search Report for EP Application No. 21152784.1, dated Jun. 23, 2021, 8 pages.

*Primary Examiner* — Jeffry H Aftergut
(74) *Attorney, Agent, or Firm* — Kinney & Lange, P.A.

(57) ABSTRACT

A process for forming a flexible composite driveshaft includes providing a mandrel having a rigid region and a compressible region, applying fiber tape to the mandrel using automated fiber placement with in-situ laser curing in the rigid region and without in-situ laser curing the compressible region, and compressing the fiber tape and compressible material in the compressible region to form diaphragms that extend radially outward to a diameter that is at least twice the size of a diameter of the composite driveshaft in the rigid region.

16 Claims, 4 Drawing Sheets

(56) References Cited

U.S. PATENT DOCUMENTS

| | | | |
|---|---|---|---|
| 6,080,343 A * | 6/2000 | Kaufman | B29C 64/141 |
| | | | 264/40.5 |
| 8,298,242 B2 | 10/2012 | Justis et al. | |
| 10,280,969 B2 | 5/2019 | Remer et al. | |
| 2010/0065717 A1 | 3/2010 | Wilson et al. | |
| 2011/0192528 A1 | 8/2011 | Kozaki et al. | |
| 2012/0283029 A1 | 11/2012 | Lawrie | |
| 2013/0291476 A1 | 11/2013 | Broughton, Jr. et al. | |
| 2017/0240714 A1 * | 8/2017 | Ahmed | B29C 70/386 |

FOREIGN PATENT DOCUMENTS

| | | |
|---|---|---|
| GB | 2571714 A | 9/2019 |
| WO | WO0166965 A1 | 9/2001 |
| WO | WO2014040871 A1 | 3/2014 |

\* cited by examiner

FLEXIBLE THERMOPLASTIC COMPOSITE COUPLING AND METHOD OF MANUFACTURE

BACKGROUND

The present disclosure is related generally to driveshafts and more particularly to a method for manufacturing a flexible composite driveshaft.

Driveshafts are used to connect components to a drive input. Known applications include but are not limited to driveshafts used to drive propellers in aerospace applications. Driveshafts transmit primarily torque and rotation. Driveshafts are generally cylindrical bodies, which can include multiple flexible elements in series that provide bending and/or axial compliances to accommodate angular and axial misalignment and mass imbalance.

Composite driveshafts can provide increased strength and reduced weight as compared to conventional metal designs. However, driveshaft designs and, particularly, the geometry of flexible elements, are limited by current composite manufacturing methods.

SUMMARY

In one aspect, a process for forming a flexible composite driveshaft includes providing a compressible mandrel, applying a fiber tape to the compressible mandrel using automated fiber placement to form a preliminary composite driveshaft having a longitudinal axis, and reducing a diameter of the composite driveshaft to form first and second diaphragms. The preliminary composite drive shaft includes a first region extending longitudinally and having a substantially constant first diameter and a second region extending longitudinally from the first region and protruding radially outward from the first region in a mound shape. The mound shape is defined by a diameter that increases radially as a function of axial position from the first diameter at a first end adjacent to the first region to a radially outermost second diameter at a central portion of the second region and decreases radially as a function of axial position from the central portion to the first diameter at a second end. The diameter of a section of the second region is reduced to divide the second region into first and second diaphragms, each of the first and second diaphragms having a diameter greater than the first diameter.

In another aspect, a flexible composite driveshaft formed by automated fiber placement includes a first region extending longitudinally about an axis and having a substantially constant first diameter and a second region adjacent to the first region and including first and second diaphragms each extending radially outward from the first region about a circumference of the driveshaft and each having second diameter that is at least twice the size of the first diameter.

In yet another aspect, a process for forming a flexible composite driveshaft includes providing a mandrel having a compressible material, applying fiber tape to the compressible material using automated fiber placement, and compressing the fiber tape and compressible material to form diaphragms. The mandrel includes a rigid cylinder, one or more first rigid members and one or more second rigid members positioned circumferentially about a portion of the outer surface of the rigid cylinder and separated from one another along a longitudinal axis of the driveshaft, and a compressible material provided around and between the first and second rigid members. A plurality of strips of fiber tape are applied to a first longitudinally extending region of the mandrel adjacent to the one or more first and second rigid members using automated fiber placement with in-situ laser curing. A plurality of strips of fiber tape are applied to a second longitudinally extending region of the mandrel comprising the one or more first and second rigid members and compressible material using automated fiber placement without in-situ laser curing. The plurality of strips of fiber tape and compressible material are compressed to conform to the one or more first and second rigid members.

The present summary is provided only by way of example, and not limitation. Other aspects of the present disclosure will be appreciated in view of the entirety of the present disclosure, including the entire text, claims, and accompanying figures.

Figure 1:
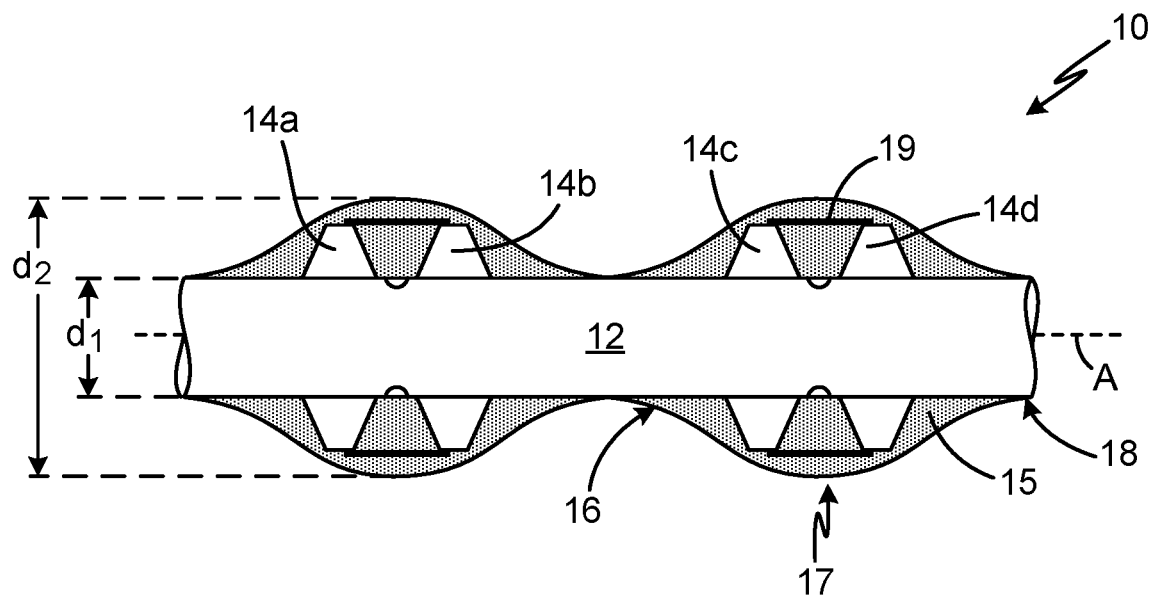
FIG. 1 is an axial cross-sectional representation of a mandrel for fabrication of a flexible composite driveshaft using automated fiber placement (AFP).

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Automated fiber placement (AFP) can be used to produce high performance composite components in which the positioning of fibers or fiber paths can be locally optimized to meet varying load requirements. The benefits provided by AFP are desirable in the manufacture of composite driveshafts; however, the size of the fiber placement head restricts the geometry of the driveshaft that can be formed by the direct, one-step, AFP layup alone. Multiple flexible elements provided in series provide bending and/or axial compliances to accommodate angular and axial misalignment and mass imbalance. A relatively sharp angle or small corner radius is required between flexible elements, but such small radii cannot be produced with AFP technology.

The disclosed method of manufacture utilizes a combination of rigid and compressible mandrel elements that provide a gradual variation in shaft diameter to allow for fiber placement using AFP. Rigid dissoluble double mound members can be positioned around a circumference of a rigid cylinder and separated and surrounded by a compressible material to provide the gradual variation in surface geometry required for AFP. Once fiber layup is complete, the fiber layers overlaying the compressible material can be compressed to conform to a shape of the mound members to produce large diameter flexible elements having sharp corner or small radius transitions at the shaft. A two-step curing process is used in which the uniform diameter shaft portion of the driveshaft is laser-cured in-situ during the AFP process. The laser can be turned off during fiber placement in regions including the compressible material to provide for subsequent deformation. The deformed region can be subsequently cured and all mandrel elements can be removed.

Flexible driveshafts can have one or more flexible elements (or diaphragms), generally defined by a change in a size of an outer diameter or radial extent of the shaft with a transition radius capable of accommodating bending during operation. Shaft bending flexibility can be increased by increasing the number of flexible elements on the shaft or a diameter of the flexible elements. Two or more flexible elements are illustrated in each of the embodiments disclosed herein. However, it will be understood that a composite driveshaft manufactured according to the present disclosure can have a single flexible element or more flexible elements than illustrated, each defined by an increase in the outer diameter or radial extent of the shaft. A small radius or sharp corner between flexible elements and on either side of a single flexible element in a transition region where the flexible element meets the shaft can be required to accommodate bending. As used herein, "sharp corner" refers to a minimum, but non-zero radius. A minimum radius size can be limited by a size and orientation of the fibers used to form the composite shaft and can be set to prevent or reduce fiber breakage. The size of the radius can vary depending on the application, applied materials, and fabrication specifics. The method of the present disclosure can be used to create constant and/or variable radii of any size limited only by a need to limit fiber breakage and is not limited to the designs illustrated herein.

Figure 2:
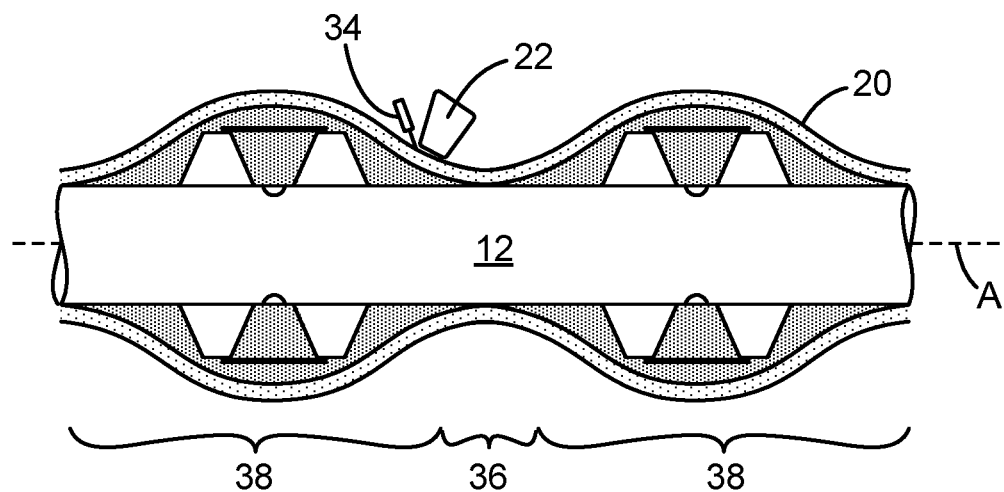
FIG. 2 is an axial cross-sectional representation of a preliminary flexible composite driveshaft formed on the mandrel of FIG. 1.

FIG. 1 is an axial cross-sectional representation of mandrel 10 for fabrication of one embodiment of a flexible composite driveshaft using AFP. Mandrel 10 includes a rigid cylinder 12, rigid members 14a-14d, and compressible material 15. Cylinder 12 and rigid members 14a-14d can be formed from any material suitable for providing a rigid and removable form for AFP as known in the art, including but not limited to tool steel and hard plastic. Rigid members 14a-14d generally define a final geometry of the flexible elements of the driveshaft. As illustrated in FIG. 1, rigid members 14a-14d can be arranged in axially-separated pairs about a circumference of cylinder 12, providing two radially extending rings around cylinder 12 at each end of cylinder 12. In alternative embodiments, rigid members can be arranged in groups of more than two to provide a driveshaft with additional flexible elements, or can be arranged to provide a single flexible member 44 (shown in FIG. 6) at each end of the drive shaft. Rigid members 14a-14d can have a non-uniform cross-section as shown in FIG. 2. The diameter of rigid members 14a-14d can be varied to improve performance. Preferably, the diameter of rigid members 14a-14d is at least twice the diameter of cylinder 12. It will be understood by one of ordinary skill in the art that rigid members 14a-14d can be positioned and shaped as needed to provide the driveshaft with sufficient bending flexibility during operation.

Each of rigid members 14a-14d can include a plurality of segments (not shown) that are circumferentially arranged to provide a substantially solid ring around cylinder 12. The geometry of the segments can be configured to allow for the segments to fall into the hollow central portion of the shaft upon removal of cylinder 12 following final curing of the flexible elements. In alternative embodiments, rigid members 14a-14d can be a dissolvable material that can be removed with washing or other known methods.

Compressible material 15 can be applied around rigid members 14a-14d to form a single mound shaped compressible form over each rigid member pair 14a, 14b and 14c, 14d. Compressible material 15 can be arranged to provide a gradual increase or transition in shaft diameter, thereby removing all sharp or small radius corner, as needed for fiber placement using AFP. As illustrated in FIG. 1 the mound-shaped compressible form extends longitudinally along cylinder 12 and protrudes radially outward from cylinder 12. The mound shape is defined by a diameter that increases radially as a function of axial position from a first diameter $d_1$ at cylinder 12 at one end 16 to a radially outermost second diameter $d_2$ at a central portion 17 of the mound and decreases radially as a function of axial position from the central portion 17 to the first diameter $d_1$ at a second end 18, thereby forming gradual transition regions between cylinder 12 and rigid members 14a-14d.

Compressible material 15 can be a form or mold shaped to fit over rigid member pair 14a, 14b and 14c, 14d. Compressible material 15 can be a dissolvable plastic, meltable metal, or other material capable of providing sufficient rigidity for fiber layup while also being substantially compressible, and removable upon final curing of the driveshaft. Compressible material that can be pressed to closely conform to the outer surfaces of rigid members 14a-14d is preferable.

In some embodiments, an additional stiffener member 19 can be provided at the top of adjacent rigid members 14a, 14b and 14c, 14d to cover the grooves formed between the rigid member pairs. Stiffener member 19 is made of a compressible material capable of conforming to the shape of the outer surfaces of rigid members 14a-14d. In some embodiments, compressible material 15 that would be otherwise provided in the grooves between adjacent rigid members 14a, 14b and 14c, 14d can be eliminated if stiffener member 19 is present.

FIG. 2 is an axial cross-sectional representation of a preliminary flexible composite driveshaft 20 formed on mandrel 10. Preliminary composite driveshaft 20 is formed by applying a thermoplastic fiber tape to mandrel 10 using AFP. The fiber tape can be wrapped around mandrel 10 or otherwise placed to cover mandrel 10 with AFP tool 22. Multiple layers of fiber tape can be applied to mandrel 10 to increase a thickness of preliminary composite driveshaft 20. It will be understood by one of ordinary skill in the art that fiber placement, fiber direction, and layering of fiber tape, can be optimized to meet local load conditions and can vary depending on the intended application.

Figure 3:
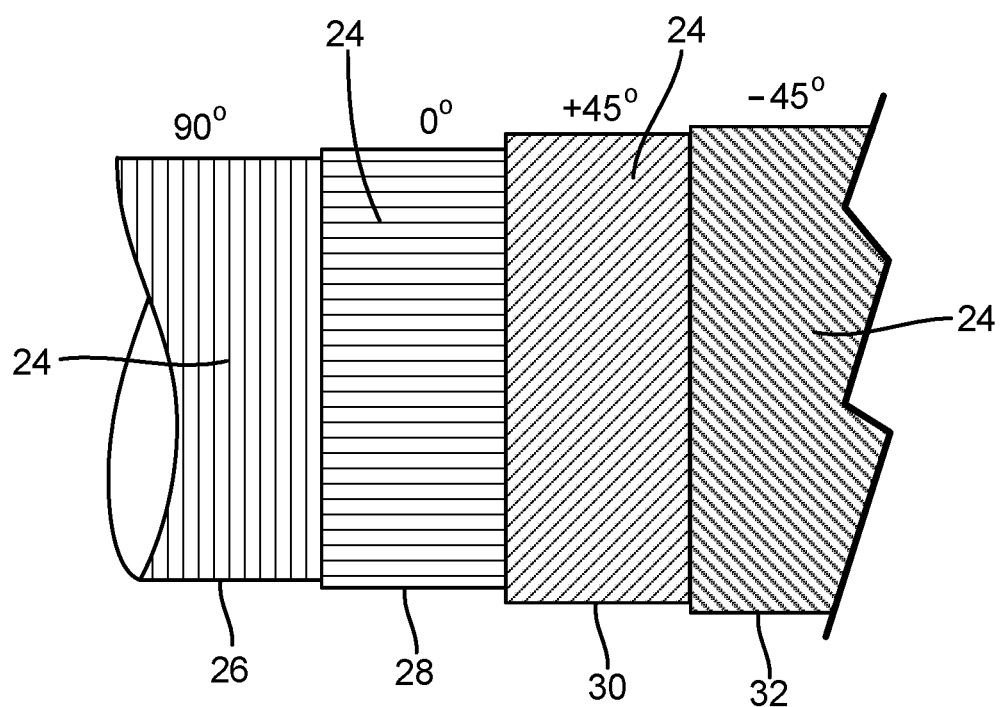
FIG. 3 is an isometric view of one embodiment of fiber layers of the preliminary flexible composite driveshaft of FIG. 2 with a portion of overlying layers removed to show underlying layers.

FIG. 3 is an isometric view of a non-limiting, simplified embodiment of a fiber layup of preliminary flexible composite driveshaft 20. As illustrated in FIG. 3, strips of fiber tape 24 can be arranged in multiple layers 26, 28, 30, 32 (FIG. 3 shows a portion of overlying layers 28, 30, 32 removed to show underlying layers). Fiber tape 24 can be arranged in a single direction in each layer 26, 28, 30, 32 and arranged to fully or partially cover mandrel 10. As illustrated, the orientation of fiber tape 24 in each layer can vary. Fiber tape 24 can be oriented in a longitudinal direction (zero degrees) to provide bending stiffness to meet dynamic response requirements. Additionally, fiber tape 24 can be arranged in a circumferential direction (90 degrees), and at any+/−angle between zero and 90 degrees. As illustrated in FIG. 3, fiber tape 24 is oriented at both+45 and −45 degrees, although it will be understood by one of ordinary skill in the art that the orientation of fiber tape 24 can be optimized to accommodate different load conditions in operation.

Fiber tape 24 can be a thermoplastic unidirectional fiber tape that can include but is not limited to carbon, glass, organic fibers, or any of combination thereof, as known in the art, preimpregnated with a thermoplastic resin matrix. The use of a thermoplastic fiber tape 24 is preferable to thermoset fiber tapes, which are irreversibly hardened by curing. The thermoplastic fiber tape 24 provides enhanced capability to form complex geometries and appears to have greater tolerance to damage as compared to thermoset materials.

During AFP, laser 34 on the AFP tool can be turned off and on to selectively cure fiber tape 24. The laser can be turned on to cure fiber tape 24 in regions 36 of the driveshaft formed directly on cylinder 12 and not requiring further deformation. The laser can be turned off to avoid curing fiber tape 24 in regions 38 of the driveshaft overlaying compressible material 15 to allow for subsequent deformation. Regions 36 extend longitudinally and can have a substantially constant diameter. Regions 38 extend longitudinally from regions 36 and protrude radially outward from regions 36 in a mound shape. In some embodiments, partial curing may be required in select locations of the compressible region to adhere strips of fiber tape. In some embodiments, a temporary adhesive material may be applied to retain placement of fiber strips 24 or fiber layup can be configured to minimize the number or location of loose fiber strips 24.

Figure 4:
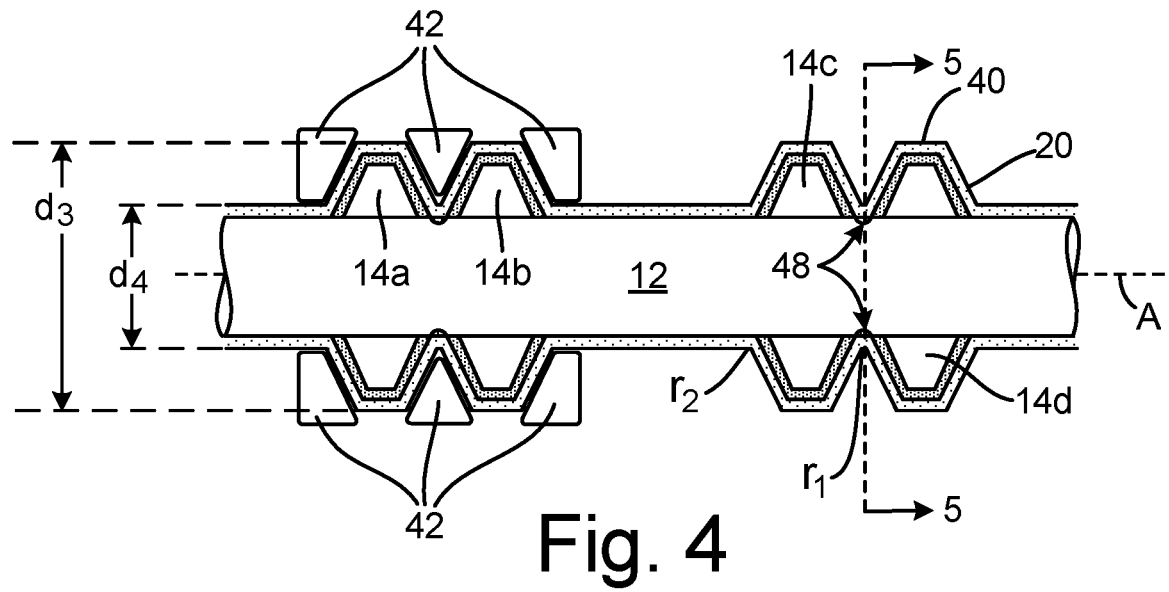
FIG. 4 is an axial cross-sectional representation of a flexible composite driveshaft following compression of the preliminary flexible composite driveshaft of FIG. 2.

FIG. 4 is an axial cross-sectional representation of flexible composite driveshaft 40 following compression of preliminary flexible composite driveshaft 20 but before mandrel 10 has been removed. One or more forming elements 42 can be placed around an outer diameter of preliminary composite driveshaft 10 to compress preliminary composite driveshaft 20 in the radial inward direction around the full circumference to produce reduced radius $r_1$ or a sharp angle between adjacent rigid members 14a, 14b and 14c, 14d, thereby forming flexible elements or diaphragms 44 (labeled in FIG. 6) and a reduced transition radius $r_2$ or sharp angle on either side of adjacent rigid member pairs 14a, 14b and 14c, 14d. A load directed radially inward toward axis A can be applied to elements 42 to compress the outer diameter in a location generally corresponding to central section 17 and in the transition regions between ends 16 and 18 and central section 17 (shown in FIG. 1). Elements 42 can be positioned between adjacent rigid members 14a, 14b and 14c, 14d and in transition regions on either side of rigid members 14a-14d. Elements 42 can be configured to fit securely between rigid members 14a-14d and have a geometry that substantially matches a desired final geometry (i.e., r or sharp angle) formed between adjacent rigid members 14a, 14b and 14c, 14d. Elements 42 can be multi- or two-piece split clamps as known in the art or other suitable clamping elements or forming molds known to provide sufficient compression and which can be used during a subsequent curing process to retain compression.

Figure 5:
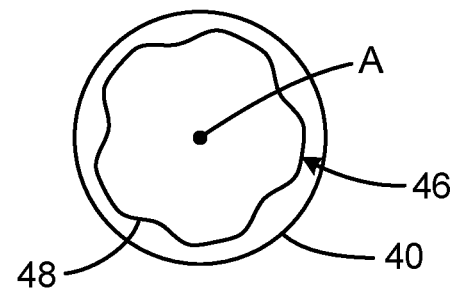
FIG. 5 is a radial cross-sectional representation of an outer diameter of the mandrel of FIG. 4 taken along the 5-5 line.

Compression of preliminary composite driveshaft 20 between rigid member pairs 14a, 14b and 14c, 14d takes fiber layers from a largest diameter $d_3$ to a smallest diameter $d_4$. Preferably, diameter $d_3$ is at least twice the size of diameter $d_4$. Fiber tape 24 oriented in a circumferential direction or generally circumferential direction will be too long for the smaller diameter $d_4$. As such, compression will cause wrinkling of the fiber tape 24 in this region. In some embodiments, a section of cylinder 12 corresponding in position to the central portion of the second region or groove between adjacent rigid members 14a, 14b and 14c, 14d can have a wavy or undulating outer surface 46 defined by circumferentially spaced indentations 48, as illustrated in FIG. 5. FIG. 5 is a schematic radial cross-sectional representation of outer diameter 46 of the composite driveshaft 40 of FIG. 4 taken along the 5-5 line. Indentations 48 can accommodate the wrinkles or folds formed upon compression by one or more of the strips of fiber tape 24 oriented in the circumferential direction. When cured, the indentations remain in place and accommodate the extra fiber or tape length. To a smaller extent, excess fiber tape length can be present on the sloping area on either side of each adjacent rigid member pair 14a, 14b and 14c, 14d. However, layout of the multiple layers can generally accommodate the mismatch in these regions. Fiber tape 24 oriented in the longitudinal direction or at ±45 degrees can generally conform to the shape of the groove between adjacent rigid members 14a, 14b and 14c, 14d provided the outer diameter $d_2$ of compressible form 15 is no excessively large in comparison to the final compressed diameter. Additional care in mandrel design may be required to limit fiber breakage during compression. For example, the size of compressible form 15 over rigid member pairs 14a, 14b and 14c, 14d can be sized (i.e., $d_2$) to provide sufficient fiber tape length to reach the bottom of the groove formed between adjacent rigid members 14a, 14b and 14c, 14d, thereby limiting a need for stretching of fiber tape 24 during compression.

Following compression, the modified sections of flexible elements 44 (labeled in FIG. 6) of preliminary driveshaft 20 can be cured in an oven as known in the art with mandrel 10 and clamping or forming elements 42 in place. Use of an autoclave, which can be required in some prior art methods, is unnecessary in the disclosed process.

Figure 6:
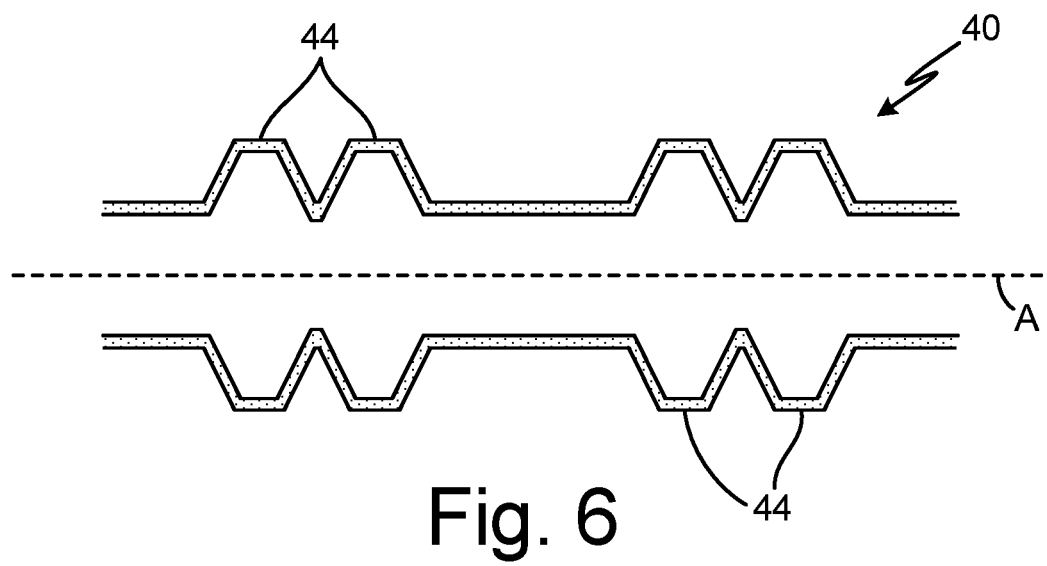
FIG. 6 is an axial cross-sectional representation of the flexible composite driveshaft of FIG. 4, following removal of the mandrel.

When the formation and curing of flexible composite driveshaft 40 is complete, all parts of mandrel 10 can be removed as previously described, leaving the hollow flexible composite driveshaft 40. FIG. 6 is a schematic axial cross-sectional representation of flexible composite driveshaft 40, with flexible elements 44, following removal of mandrel 10.

Figure 7:
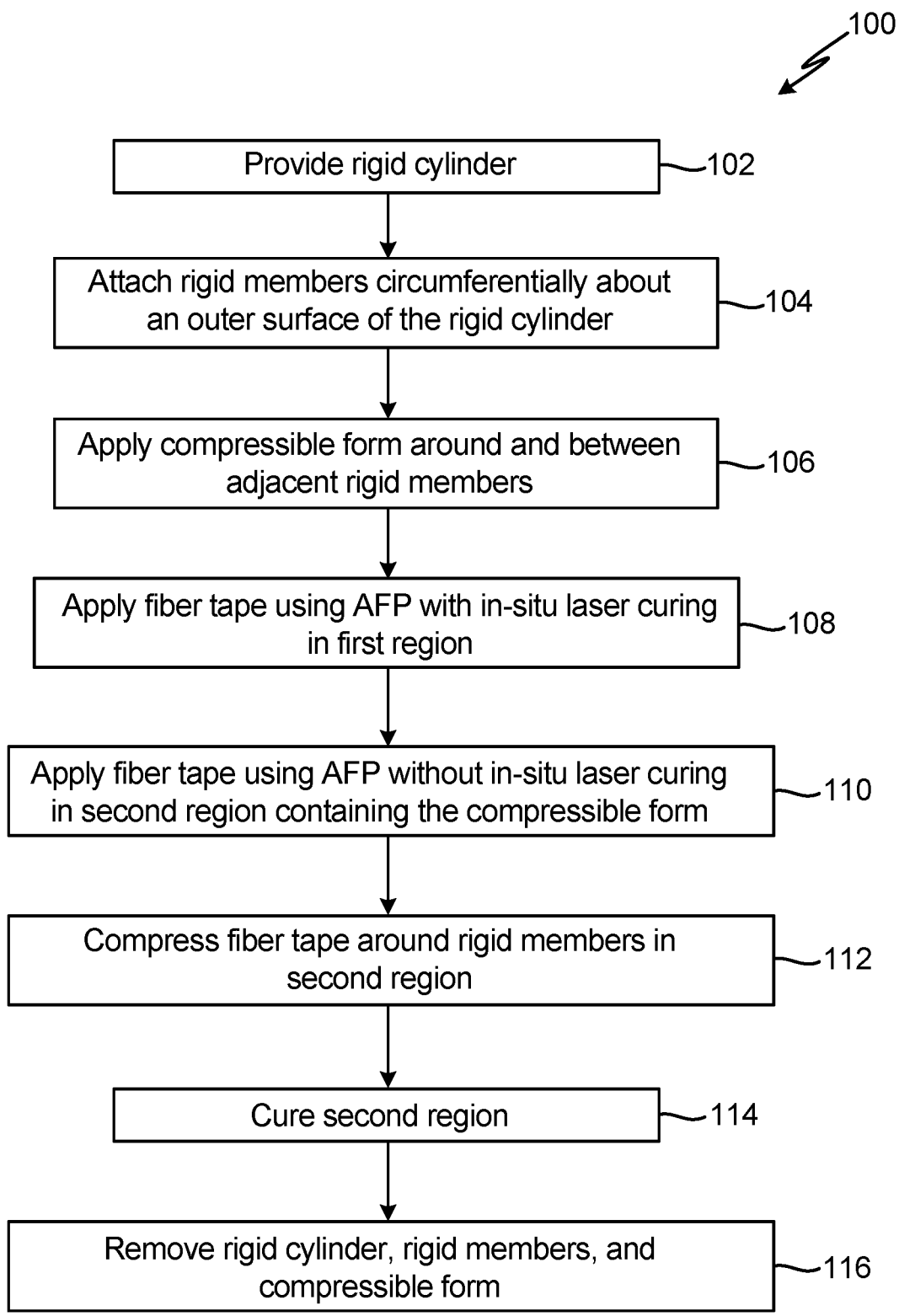
FIG. 7 is a flow chart of a method for forming a flexible composite driveshaft.

FIG. 7 is a flow chart of a method for forming a flexible composite driveshaft 40. A previously described, mandrel 10 can be assembled by providing a rigid cylinder 12 (step 102), attaching one or more rigid members 14a-14d circumferentially about an outer surface of cylinder 12 (step 104), and applying a compressible form or material 15 around and between adjacent rigid members 14a, 14b and 14c, 14d (step 106). Fiber tape 24 is applied to mandrel 10 using AFP with in-situ laser curing in regions formed directly on cylinder 12 (step 108) and without in-situ curing in regions containing the compressible form (step 110). A laser used for in-situ curing can be turned on to cure fiber tape 24 and can be turned off to leave fiber tape 24 uncured. Fibers are compressed around rigid members 14a-14d to form flexible elements 44 (step 112). The uncured region is subsequently cured in an oven while maintaining compression (step 114). Once the flexible composite driveshaft is fully shaped and cured, all parts of mandrel 10 are removed, for example, by physical extraction, washing or melting of material, or other methods known in the art (step 115).

The disclosed method of manufacture capitalizes on the advantages provided by thermoplastic AFP, while overcoming the limitations of current AFP technology to achieve small radius or sharp corner transitions required in flexible driveshaft design.

Discussion of Possible Embodiments

The following are non-exclusive descriptions of possible embodiments of the present invention.

A process for forming a flexible composite driveshaft includes providing a compressible mandrel, applying a fiber tape to the compressible mandrel using automated fiber placement to form a preliminary composite driveshaft having a longitudinal axis, and reducing a diameter of the composite driveshaft to form first and second diaphragms. The preliminary composite drive shaft includes a first region extending longitudinally and having a substantially constant first diameter and a second region extending longitudinally from the first region and protruding radially outward from the first region in a mound shape. The mound shape is defined by a diameter that increases radially as a function of axial position from the first diameter at a first end adjacent to the first region to a radially outermost second diameter at a central portion of the second region and decreases radially as a function of axial position from the central portion to the first diameter at a second end. The diameter of a section of the second region is reduced to divide the second region into first and second diaphragms, each of the first and second diaphragms having a diameter greater than the first diameter.

The process of the preceding paragraph can optionally include, additionally and/or alternatively, any one or more of the following features, configurations additional components, and/or steps:

A further embodiment of the foregoing process can include curing the first region during automated fiber placement with a laser and leaving the second region substantially uncured during automated fiber placement.

A further embodiment of any of the foregoing processes, wherein leaving the second region substantially uncured can include turning off the laser during automated fiber placement.

A further embodiment of any of the foregoing processes, wherein reducing a diameter of a section of the second region can include applying pressure to the section with a forming element.

A further embodiment of any of the foregoing processes, wherein providing the compressible mandrel can include providing a rigid cylinder, wherein an outer surface of the rigid cylinder provides a surface for automated fiber placement in the first region, positioning one or more first rigid members and one or more second rigid members circumferentially about a portion of the outer surface of the rigid cylinder, wherein the one or more first and one or more second rigid members are configured to provide a shaping form for the first or second diaphragm, and providing a compressible material between and on either side of the first and second rigid members, wherein the compressible material provides a surface for automated fiber placement in the second region.

A further embodiment of any of the foregoing processes can further include applying pressure to end sections of the second region about a circumference to reduce a transition radius between the first and second regions.

A further embodiment of any of the foregoing processes, wherein the rigid cylinder can have a section corresponding in position to the central portion of the second region, the section having an outer surface defined by circumferentially spaced indentations.

A further embodiment of any of the foregoing processes, wherein applying the fiber tape can include applying a plurality of strips of unidirectional fiber tape in a longitudinal direction and a circumferential direction and wherein the indentations accommodate wrinkles formed upon compression by one or more of the plurality of strips of tape oriented in the circumferential direction.

A further embodiment of any of the foregoing processes can further include providing a clamping member to the central portion to apply pressure to the central portion during the curing process.

A further embodiment of any of the foregoing processes can further include removing the rigid cylinder, the one or more first and second rigid members, and the compressible material following curing of the second region.

A flexible composite driveshaft formed by automated fiber placement includes a first region extending longitudinally about an axis and having a substantially constant first diameter and a second region adjacent to the first region and including first and second diaphragms each extending radially outward from the first region about a circumference of the driveshaft and each having second diameter that is at least twice the size of the first diameter.

The flexible composite driveshaft of the preceding paragraph can optionally include, additionally and/or alternatively, any one or more of the following features, configurations and/or additional components:

A further embodiment of the foregoing flexible composite driveshaft, wherein the first and second regions can each include a plurality of strips of unidirectional fiber tape, the plurality of strips oriented in a longitudinal direction and in a circumferential direction.

A further embodiment of any of the foregoing flexible composite driveshafts, wherein at least one of the circumferentially-oriented strips of unidirectional fiber tape positioned between the first and second diaphragms can include a plurality of folds formed about the circumference of the driveshaft.

A further embodiment of any of the foregoing flexible composite driveshafts, wherein the plurality of strips of unidirectional fiber tape can be unwoven and arranged in a plurality of stacked layers.

A process for forming a flexible composite driveshaft includes providing a mandrel having a compressible material, applying fiber tape to the compressible material using automated fiber placement, and compressing the fiber tape and compressible material to form diaphragms. The mandrel includes a rigid cylinder, one or more first rigid members and one or more second rigid members positioned circumferentially about a portion of the outer surface of the rigid cylinder and separated from one another along a longitudinal axis of the driveshaft, and a compressible material provided around and between the first and second rigid members. A plurality of strips of fiber tape are applied to a first longitudinally extending region of the mandrel adjacent to the one or more first and second rigid members using automated fiber placement with in-situ laser curing. A plurality of strips of fiber tape are applied to a second longitudinally extending region of the mandrel comprising the one or more first and second rigid members and compressible material using automated fiber placement without in-situ laser curing. The plurality of strips of fiber tape and compressible material are compressed to conform to the one or more first and second rigid members.

The process of the preceding paragraph can optionally include, additionally and/or alternatively, any one or more of the following features, configurations additional components, and/or steps:

A further embodiment of the foregoing process can include curing the second region, wherein a clamping element is provided to maintain compression during curing.

A further embodiment of any of the foregoing processes, wherein the rigid cylinder can have a section corresponding in position to a location between the first and second rigid members and can have an outer surface defined by circumferentially spaced indentations.

A further embodiment of any of the foregoing processes, wherein applying the fiber tape can include applying a plurality of strips of unidirectional fiber tape in a longitudinal direction and a circumferential direction and wherein the indentations can accommodate wrinkles formed upon compression by one or more of the plurality of strips of tape oriented in the circumferential direction A further embodiment of any of the foregoing processes can include removing the rigid cylinder, the one or more first and second rigid members, and the compressible material following curing of the second region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process for forming a flexible composite driveshaft, the process comprising:
   applying a fiber tape to a compressible mandrel using automated fiber placement to form a preliminary composite driveshaft having a longitudinal axis, the preliminary composite drive shaft comprising:
      a first region extending longitudinally and having a substantially constant first diameter; and
      a second region extending longitudinally from the first region and protruding radially outward from the first region in a mound shape defined by a diameter that increases radially as a function of axial position from the first diameter at a first end adjacent to the first region to a radially outermost second diameter at a central portion of the second region and decreases radially as a function of axial position from the central portion to the first diameter at a second end; and
   reducing a diameter of a section of the second region to divide the second region into first and second diaphragms, each of the first and second diaphragms having a diameter greater than the first diameter.

2. The process of claim 1, and further comprising:
   curing the first region during automated fiber placement; and
   leaving the second region substantially uncured during automated fiber placement.

3. The process of claim 2, wherein leaving the second region substantially uncured comprises turning off a laser during automated fiber placement.

4. The process of claim 3, wherein reducing a diameter of a section of the second region comprises applying pressure to the section with a forming element.

5. The process of claim 1, wherein providing the compressible mandrel comprises:
   providing a rigid cylinder, wherein an outer surface of the rigid cylinder provides a surface for automated fiber placement in the first region;
   positioning one or more first rigid members and one or more second rigid members circumferentially about a portion of the outer surface of the rigid cylinder, wherein the one or more first and one or more second rigid members are configured to provide a shaping form for the first or second diaphragm; and
   providing a compressible material between and on either side of the first and second rigid members, wherein the compressible material provides a surface for automated fiber placement in the second region.

6. The process of claim 5, and further comprising applying pressure to end sections of the second region about a circumference to reduce a transition radius between the first and second regions.

7. The process of claim 5, wherein the rigid cylinder has a section corresponding in position to the central portion of the second region, the section having an outer surface defined by circumferentially spaced indentations.

8. The process of claim 5, wherein applying the fiber tape comprises applying a plurality of strips of unidirectional fiber tape in a longitudinal direction and a circumferential direction and wherein the indentations accommodate wrinkles formed upon compression by one or more of the plurality of strips of tape oriented in the circumferential direction.

9. The process of claim 5, and further comprising curing the second region.

10. The process of claim 9, and further comprising providing a clamping member to the central portion to apply pressure to the central portion during the curing process.

11. The process of claim 10, and further comprising removing the rigid cylinder, the one or more first and second rigid members, and the compressible material from the flexible composite driveshaft following curing of the second region.

12. A process for forming a flexible composite driveshaft, the process comprising:
   providing a mandrel comprising:
      a rigid cylinder;
      one or more first rigid members and one or more second rigid members, each of the one or more first and second rigid members positioned circumferentially about a portion of the outer surface of the rigid cylinder, wherein the one or more first rigid member are separated from the one or more second rigid members along a longitudinal axis of the driveshaft; and
      a compressible material provided around and between the first and second rigid members;
   applying a plurality of strips of fiber tape to a first longitudinally extending region of the mandrel adjacent to the one or more first and second rigid members using automated fiber placement with in-situ laser curing;
   applying the plurality of strips of fiber tape to a second longitudinally extending region of the mandrel comprising the one or more first and second rigid members and compressible material using automated fiber placement without in-situ laser curing; and compressing the plurality of strips of fiber tape and compressible material to conform to the one or more first and second rigid members.

13. The process of claim 12, and further comprising curing the second region, wherein a clamping element is provided to maintain compression during curing.

14. The process of claim 13, wherein the rigid cylinder has a section corresponding in position to a location between the first and second rigid members and has an outer surface defined by circumferentially spaced indentations.

15. The process of claim 14, wherein applying the fiber tape comprises applying a plurality of strips of unidirectional fiber tape in a longitudinal direction and a circumferential direction and wherein the indentations accommodate wrinkles formed upon compression by one or more of the plurality of strips of tape oriented in the circumferential direction.

16. The process of claim 13, and further comprising removing the rigid cylinder, the one or more first and second rigid members, and the compressible material following curing of the second region.

\* \* \* \* \*